W. F. HOSFORD.
CONTACT MEMBER.
APPLICATION FILED SEPT. 8, 1911.
1,132,094.     Patented Mar. 16, 1915.
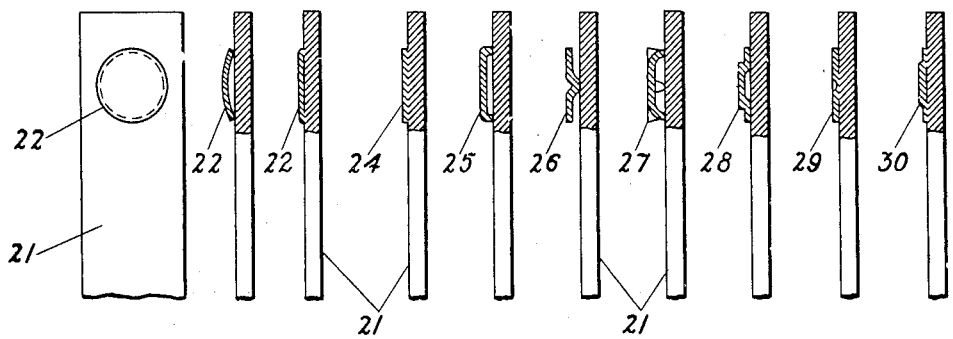
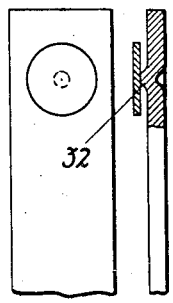
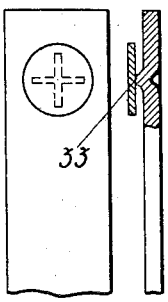
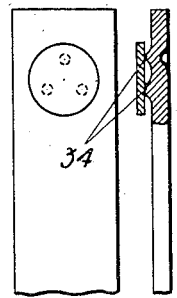
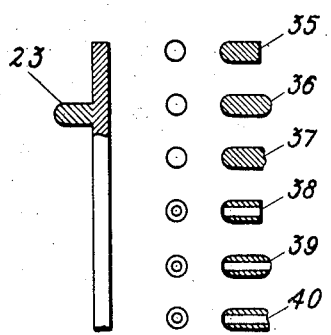
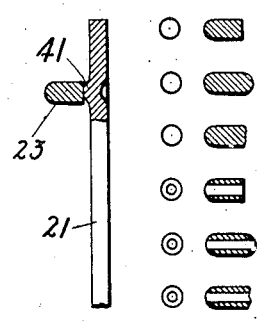
Witnesses:  
Inventor:  
William F. Hosford.

UNITED STATES PATENT OFFICE.

WILLIAM F. HOSFORD, OF WEST CHICAGO, ILLINOIS, ASSIGNOR TO WESTERN ELECTRIC COMPANY, OF NEW YORK, N. Y., A CORPORATION OF ILLINOIS.

CONTACT MEMBER.

1,132,094.  Specification of Letters Patent.  Patented Mar. 16, 1915.

Application filed September 8, 1911. Serial No. 648,347.

*To all whom it may concern:*

Be it known that I, WILLIAM F. HOSFORD, citizen of the United States, residing at West Chicago, in the county of Dupage and State of Illinois, have invented a certain new and useful Improvement in Electrical Contact Member, of which the following is a full, clear, concise, and exact description.

My invention relates to electrical contact devices, and more particularly to switch contact springs such as are used in electrical relays, springjacks and the like.

Contact points for small switches are usually made of platinum because it is not subject to oxidation or corrosion and is highly refractory. Contact springs of relays, springjack switches and the like are therefore generally made of German silver with platinum studs riveted in place at the points where electrical contact is to be made. But owing to the high cost of platinum and other suitable highly refractory metals, there have been several attempts to provide a cheaper construction, because the only part actually required to be of platinum is the face of the contact point and any part of the platinum used merely to hold the contact face in position (as the shank portion of a rivet) is performing only a mechanical function which might just as well be performed by less costly material.

It has therefore been proposed to make the contact studs or points by preparing a compound sheet of copper with a very thin facing of platinum foil soldered or brazed thereon, and punching out of this compound sheet the studs or disks to be used as contact points; these studs being then riveted or otherwise frictionally secured in holes in the German silver switch springs. It is a matter of some difficulty to prepare compound sheets of copper and platinum foil so that the two parts will not separate, but the saving in platinum has been sufficient to justify such attempts.

By my invention it becomes unnecessary either to make such compound plates of platinum and copper or to use the costly platinum itself for the shanks of rivets or studs, as I find that it is possible to fasten a very small piece of platinum, such as a disk of foil or a minute stud, directly to the body of the switch spring by welding, the parts to be welded being preferably so formed that the opposed surfaces are initially in actual contact only at a point or points or a portion of very limited area, such as a rim or edge, at which the weld is started. It is in fact unnecessary that the weld be continuous throughout the opposed surfaces, as a union at a spot or spots or around the edge only will be sufficient to hold the piece of platinum in place upon the body of the switch spring and to establish electrical as well as mechanical union therewith.

In the drawings—Figures 1, 2 and 3 show the preferred form of my invention, Fig. 1 being a front view thereof, Fig. 3 being a side view thereof partly in section, and Fig. 2 being a side view of the parts partly in section taken just before performing the welding operation; Figs. 4, 9 and 10 show modifications of my invention; Figs. 5, 6, 7 and 8 show further modifications of my invention, the parts being shown as in Fig. 2 just before the welding operation is performed; Figs. 11, 12, 13 and 14 show additional modifications of my invention in which the struck-up projections are upon the spring portion rather than upon the plate portion as in Figs. 5, 6, 7 and 8. Figs. 15 and 16 show still further modifications of my invention, these figures showing my invention as applied to point contact springs rather than plate contact springs as shown in Figs. 1 to 14.

Referring particularly to Figs. 1, 2 and 3, 21 represents the contact spring composed of German silver but which may be of any desired metal or any desired configuration, the end thereof only being shown; 22 represents the platinum contact plate which serves to coöperate with a contact point 23 (see Fig. 15) in the making and the breaking of the circuit. As will be observed from Figs. 1 and 2, this contact plate 22 is a comparatively thin circular punching, preferably of platinum, which in the punching operation has been slightly dished, that is, made concavo-convex so that, when it is applied to the plates preparatory to welding, contact is made between the plate and spring only along the edge of the plate. This condition is desirable in order that the welding current, in passing through the plate and spring will first create a welding heat localized at the edge of such plate in the nature of a spot welding operation. The welding operation may be continued as long as desired provided no burning of the coöperating parts takes place, but I prefer that such welding operation shall be stopped some time before the entire surface of the platinum plate is welded to the spring.

It may be here observed that since the welding operation is entirely local and preferably of very restricted area, whatever softening or loss of temper may take place in the spring due to the welding operation will be but of slight extent and so located as not to in any way detrimentally affect the operation or efficiency of the spring.

Fig. 4 shows the form of my invention wherein a flat plate of platinum or other highly refractory metal 24 is welded to a contact spring of German silver or other baser metal 21.

Fig. 5 shows a contact plate 25 of slightly modified form adapted to produce switch contacts in accordance with my invention. This contact plate 25 is so shaped that an annular struck-up portion exists at the edge thereof as clearly shown in the drawings.

Fig. 6 similarly shows a contact plate 26 having a central struck-up projection, which projection coöperates with the contact spring 21 to produce a spot weld during the welding operation.

Fig. 7 shows a contact plate having a plurality of projections struck up at the edge thereof to produce in coöperation with the contact spring 21 spot welds at the periphery of such plate.

Fig. 8 shows a stamped contact plate 28 in which at the beginning of the welding operation only an annular portion at the edge thereof is in contact with the contact spring.

Fig. 9 shows a finished contact spring in accordance with my invention in which the welding operation is performed by an electrode placed on the plate side of the device having a central projection, so that the greatest pressure, and therefore the initial weld, takes place centrally of the contact plate, and such contact plate at the end of the welding operation has its central portion slightly depressed.

Similarly Fig. 10 shows a finished contact spring embodying my invention in which the welding electrode coöperating with the contact plate has an annular projection adapted to coöperate with the edge of the contact plate 30.

Fig. 11 shows to the left a finished contact spring embodying my invention in which before the welding operation there existed a struck-up annular projection upon the contact plate 31, as clearly shown in the right-hand portion of such figure.

Fig. 12 likewise shows to the left a finished contact plate embodying my invention in which the contact plate before the welding operation was formed with a single struck-up projection 32 adapted to be placed centrally of the contact plate, as clearly shown to the right of such figure.

Fig. 13 shows the contact spring formed with a struck-up projection 33 in the form of a cross adapted to be located in the welding operation concentrically with the contact plate.

Fig. 14 shows the contact spring provided before the welding operation with a plurality of struck-up projections 34, as shown to the right in such figure.

Fig. 15 shows the form of my invention comprising the point contact of a coöperating pair of contacts, such figure showing to the left the finished point contact and to the right thereof end views and longitudinal views in section of the platinum points before being applied to the contact spring 21. 35 shows a solid flat-ended platinum point; 36 a solid platinum point having both ends rounded, the end to be welded to the spring being rounded as well as the working end in order to produce a weld in the nature of a spot weld between such point and spring; 37 shows a contact point, the end to be welded being of irregular formation to assist in the proper forming of the weld; 38, 39, 40 show tubular contact points, the formation of such points being otherwise similar to those shown in 35, 36, 37.

Fig. 16 shows a contact spring and points, adapted to be used in forming switch contacts in accordance with my invention, in which the contact spring 21 is provided with a struck-up projection 41 to coöperate with the platinum point 23 in producing a proper weld.

My invention in any of the various forms shown and described produces and is a highly efficient and reliable electrical switch contact. The platinum, being welded to the supporting spring by an intimate, fluxless, solderless union, is unchanged in character and possesses without modification all the properties which make it valuable as a switch contact. Furthermore, the joint between the platinum and the German silver is of such a nature that the heat formed by the making and breaking of the electrical circuit will not cause the platinum to work loose from the supporting spring, as may be the case with riveted or frictionally-held contact plates and points.

While I have throughout this description referred to the contact portion as being of platinum and the spring as being of German silver, it will be understood that my invention is not restricted to contact devices composed of such substances but that any suitable refractory metal or alloy may be substituted for platinum and any suitable baser metal or alloy may be substituted for German silver.

Having described my invention, I claim:

An electrical contact member comprising a strip of spring metal having a projecting contact piece of highly refractory metal such as platinum, of smaller dimension of attaching area than the width of said strip and electrically welded to the latter.

In witness whereof, I hereunto subscribe my name this 2nd day of September A. D., 1911.

WILLIAM F. HOSFORD.

Witnesses:
D. LEVINGER,
C. H. GULLION.